United States Patent
Detwiler

(10) Patent No.: US 8,870,073 B2
(45) Date of Patent: Oct. 28, 2014

(54) METHODS AND APPARATUS FOR POSITIONING AN OPTICAL CODE FOR IMAGING SCANNING

(75) Inventor: Paul Oliver Detwiler, Lawrenceville, GA (US)

(73) Assignee: NCR Corporation, Duluth, GA (US)

(*) Notice: Subject to any disclaimer, the term of this patent is extended or adjusted under 35 U.S.C. 154(b) by 186 days.

(21) Appl. No.: 13/482,000

(22) Filed: May 29, 2012

(65) Prior Publication Data

US 2013/0320091 A1 Dec. 5, 2013

(51) Int. Cl.
*G06K 7/10* (2006.01)

(52) U.S. Cl.
USPC .......... 235/462.11; 235/383; 235/462.2; 235/462.24; 235/462.31; 235/462.32; 235/462.41

(58) Field of Classification Search
USPC .......... 235/383, 462.11, 462.2, 462.24, 235/462.31, 462.32, 462.41
See application file for complete search history.

(56) References Cited

U.S. PATENT DOCUMENTS

| 7,900,840 B2 | 3/2011 | Herwig |
| 8,028,916 B2 | 10/2011 | Herwig |
| 8,321,285 B1* | 11/2012 | Hurst .............................. 705/21 |
| 2009/0039166 A1* | 2/2009 | Herwig et al. ........... 235/462.42 |

* cited by examiner

*Primary Examiner* — Kristy A Haupt

(74) *Attorney, Agent, or Firm* — Harden E. Stevens, III; Paul W. Martin

(57) ABSTRACT

An apparatus and methods are presented for improving image scanning. A point of sale terminal apparatus, including an imaging scanner, provides information to an operator indicating the optimal scanning position for an optical code for efficient first pass scanning by the imaging scanner. The information includes real-time video from an image capture device of the imaging scanner displayed on an operator's display device.

21 Claims, 5 Drawing Sheets

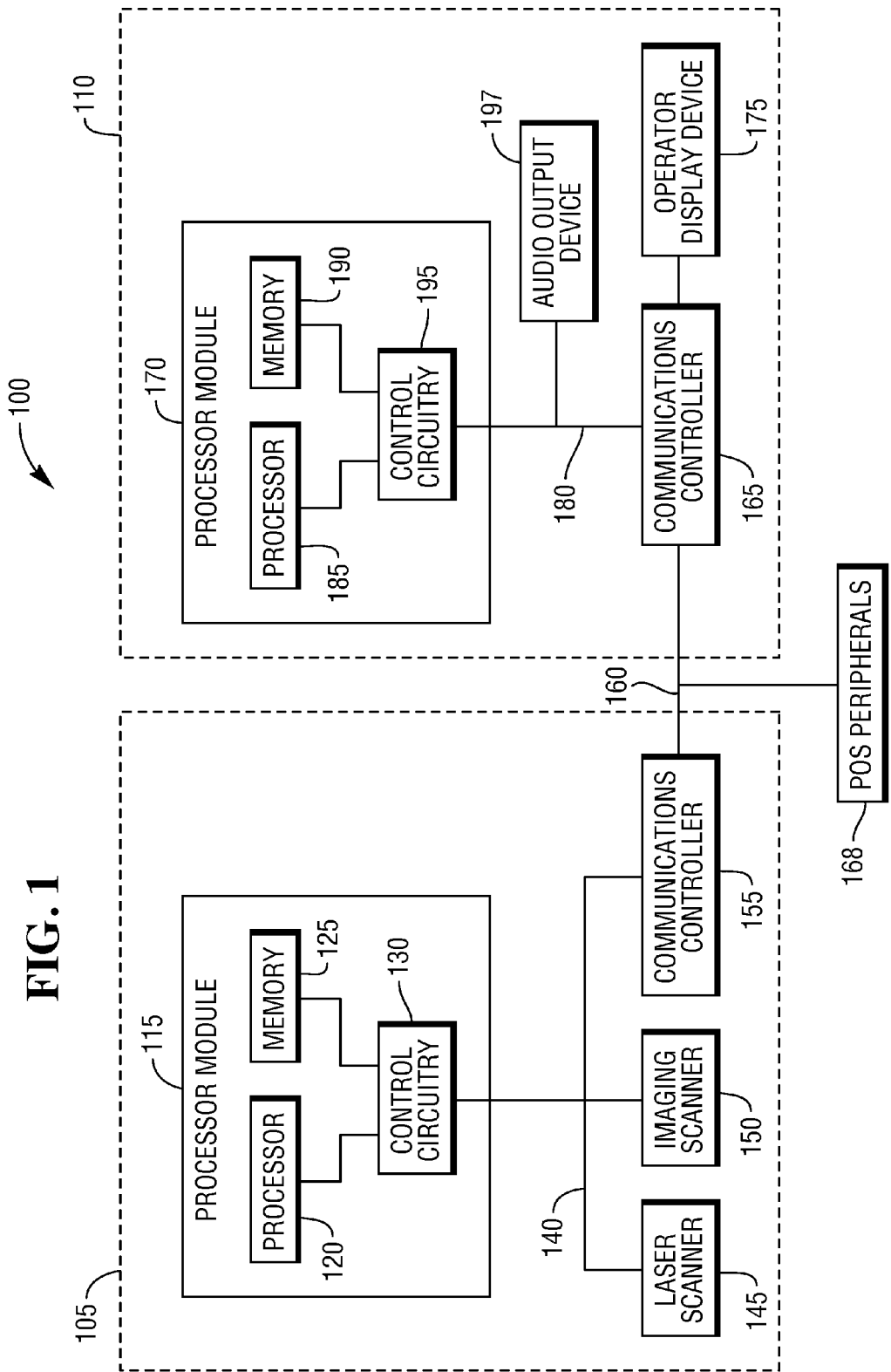

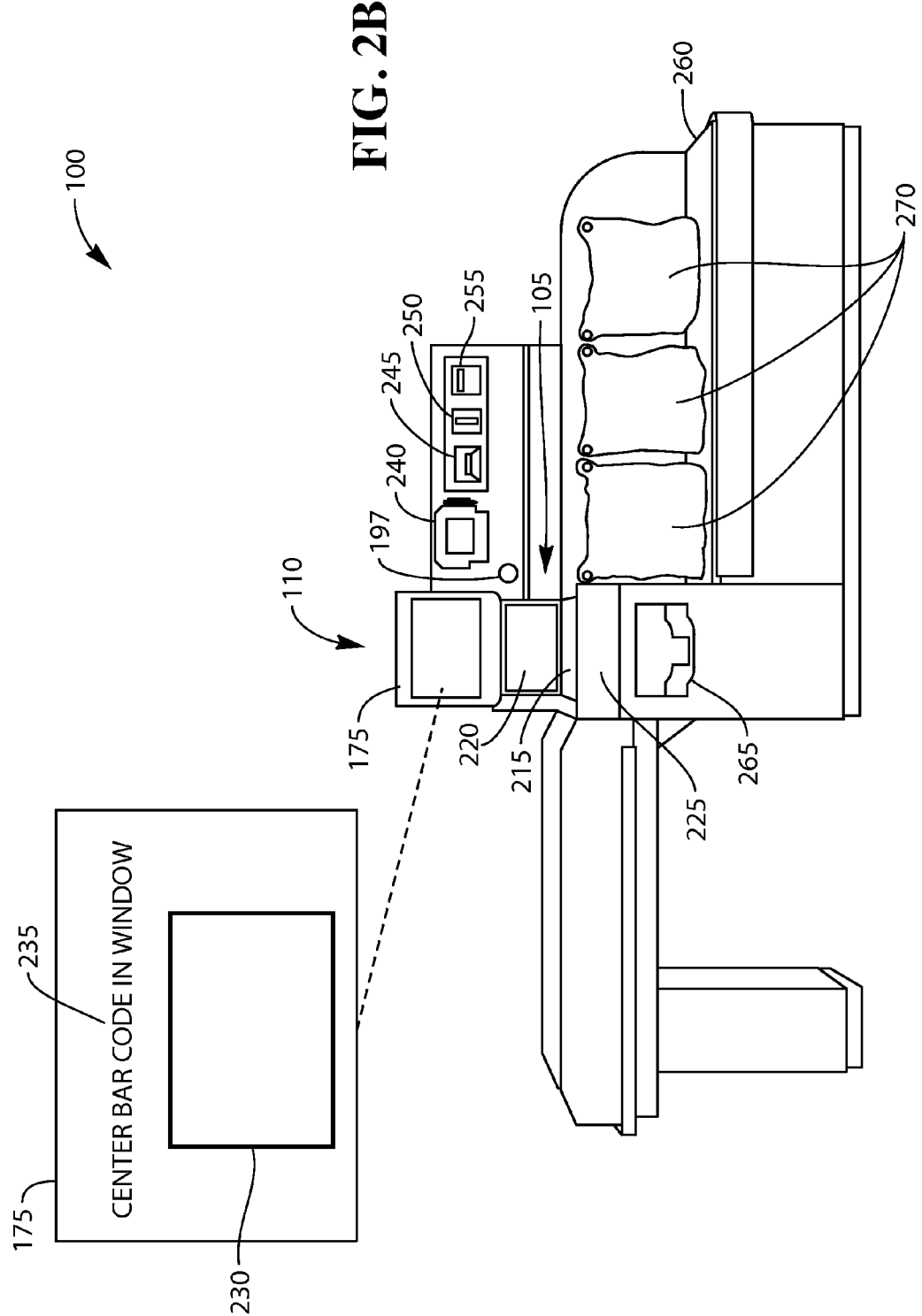

METHODS AND APPARATUS FOR POSITIONING AN OPTICAL CODE FOR IMAGING SCANNING

FIELD OF THE INVENTION

The present invention relates generally to improvements to optical code scanning. More particularly, but not exclusively, the invention relates to improvements to methods and a apparatus for indicating the optimal scanning position for an optical code presented for imaging scanning.

BACKGROUND

Any discussion of prior art throughout the specification should in no way be considered as an admission that such prior art is widely known or forms part of common general knowledge in the field.

Point of sale (POS) terminals have been used to process purchase transactions for many years. A POS terminal can be configured as a self-service POS terminal that is operated by a customer or as an assisted POS terminal that is operated by an employee. A POS terminal typically includes a device that reads optical codes such as an imaging scanner. A POS terminal may also use a hybrid optical code scanner that includes both an imaging scanner and a laser scanner.

In a hybrid optical code scanner, the two scanners independently scan or read optical codes presented for scanning. A barcode is an example of one type of optical code that is commonly used to identify items presented for purchase. When a barcode is presented, a laser scanner sweeps a laser beam across the barcode, captures reflected light from the barcode and processes the captured light to extract information from the barcode. An imaging scanner reads a barcode by capturing a complete image of the barcode and then processing the image to extract the information from the barcode.

Optical codes presented to an imaging scanner generally face away from the operator and toward the imaging scanner. Additionally, the optical code is usually attached to an object or the optical code is displayed on a portable electronic device. In these situations, the actual location of the optical code is obscured from the operator by the object or electronic device. This makes the scanning of an optical code by an imaging scanner essentially a blind operation for the operator.

To further complicate the scanning process, the optimal scanning position for an imaging scanner is relatively small and the exact location is not obvious to an operator. The combination of not knowing the optimal location for scanning an optical code and not being able to see the position of the optical code significantly reduce first scan performance which increases the overall time required to scan an optical code. When the operator is a customer, the increased scanning time negatively affects the customer's shopping experience. When the operator is an employee, the increased scan time causes delays in processing a customer's purchase and increases the stress on the operator which lowers the operator's job satisfaction.

Therefore, there is a need for a point of sale terminal with improved imaging scanning that identifies an optimal scanning position for an optical code and aids the operator in placing the optical code in the optimal scanning position.

SUMMARY OF THE INVENTION

It is an object of the present invention to overcome or ameliorate at least one of the disadvantages of the prior art, or to provide a useful alternative.

Among its several aspects, one embodiment of the present invention recognizes a condition where an operator of a point of sale terminal has difficultly determining the optimal scanning position for presenting an optical code to an imaging scanner for scanning. One aspect of the present invention provides real-time or near real-time video images to the operator where the video images include superimposed indicia indicating the optimal scanning position for an optical code presented for scanning by the imaging scanner. Viewing the video images, the operator observes the spatial relationship between the optimal scanning position indicated by the indicia and an actual optical code being presented for scanning. The operator, with the aid of the video images and the indicia, moves the optical code until it is located at the optimal scanning position. The imaging scanner then captures an image of the optical code, processes the captured image and extracts data from optical code which is sent to the point of sale terminal.

In accordance with an embodiment of the present invention, there is provided a point of sale terminal comprising: a display device operable to display text and video data to an operator of the point of sale terminal; a computer peripheral network operable to communicate with peripherals attached to the point of sale terminal; and an optical code imaging scanner connected to the computer peripheral network. The imaging scanner including: an image capture device operable to capture an image and further operable to capture continuous images to produce a video stream and where the image capture device captures images of an optical code or document presented to the optical code imaging scanner; and processing elements operable to analyze the captured image to extract data from the optical code and further operable to send the video stream over the computer peripheral network. The point of sale terminal further comprises processing elements operable to receive the video stream from the optical code imaging scanner, display the video stream on the display device and provide instructions for optimal positioning of the optical code for scanning.

In accordance with another embodiment of the present invention, there is provided a computer implemented method of imaging scanning by a point of sale terminal, the method comprising the steps of: receiving real-time video images from an image capture device of an imaging scanner; modifying the real-time video to superimpose positioning indicia on the video wherein the positioning indicia indicates the optimal scanning position for scanning an optical code; displaying the modified video images including the positioning indicia on a display device of the point of sale terminal; and receiving from the imaging scanner data extracted from the optical code.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

FIG. 1 is a high-level block diagram illustrating an exemplary embodiment of a point of sale terminal.

FIG. 2B is a high-level illustration an exemplary embodiment of a point of sale terminal.

DETAILED DESCRIPTION

Figure 2A:
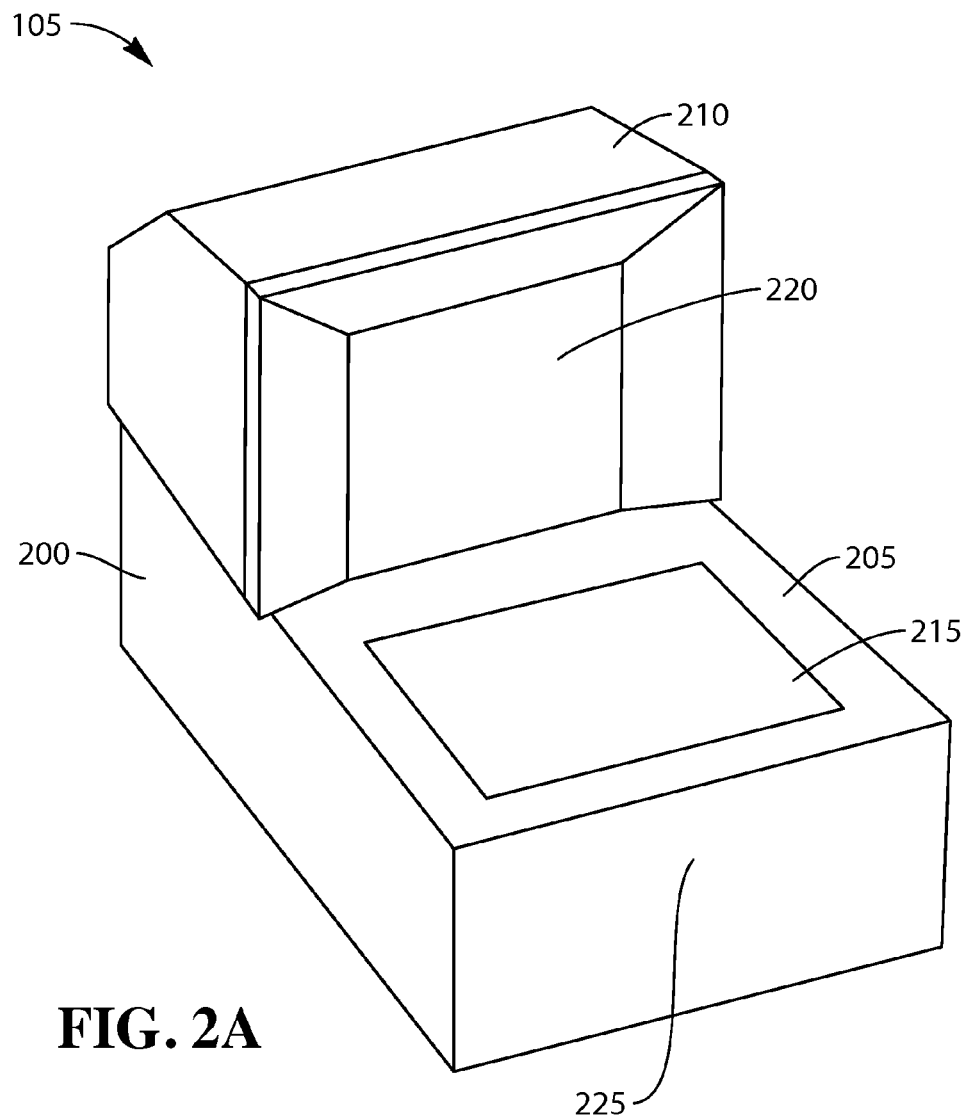
FIG. 2A is a high-level drawing illustrating an exemplary embodiment of a hybrid optical code scanner.

In the following description, numerous details are set forth to provide an understanding of the claimed invention. However, it will be understood by those skilled in the art that the claimed invention may be practiced without these details and that numerous variations or modifications from the described embodiments are possible and envisioned.

As used herein, the term optical code includes machine-readable indicia such as one-dimensional (1D) barcodes, two-dimensional (2D) barcodes and others.

Referring now to FIG. 1, there is provided a high-level block diagram illustrating an exemplary embodiment of a point of sale (POS) terminal apparatus 100. The POS terminal 100 includes a hybrid optical code scanner ("hybrid scanner") 105 and a point of sale computer component 110. The hybrid scanner 105 and the POS computer component 110 communicate over a computer peripheral network 160. The hybrid optical code scanner 105 includes a processor module 115 (processing elements), a laser scanner 145, an imaging scanner 150 and a communications controller 155. The POS computer component 110 includes a processor module 170 (processing elements), an audio output device 197, a communications controller 165 and an operator display device 175.

The processor module 115 of the hybrid scanner 105 includes a processor 120, a memory 125 and control circuitry 130. The memory 125 includes both volatile and non-volatile memory. The non-volatile memory may include flash memory or other types of solid state electronic memory. Software stored in the memory 125 is executed by the processor 120 and causes the processor 125 to control the devices and operation of the hybrid scanner 105. The control circuitry 130 provides an interface between the processor 120 and the memory 125 and between the processor 120 and a computer bus 140 used to communicate with other devices that comprise the hybrid optical code scanner 105 including but not limited to the laser scanner 145, imaging scanner 150 and communications controller 155.

The communications controller 155 includes hardware and software required for the hybrid scanner 105 to communicate with external devices and peripherals over the computer peripheral network 160. The hybrid scanner 105 and POS peripherals 168 (see FIG. 2B) communicate over with the POS computer component 110 over the peripheral network 160. In some embodiments, the computer peripheral network 160 is implemented using an industry standard universal serial bus (USB). In other embodiments, the computer peripheral network 160 may include wired or wireless communications links or both.

The processor module 170 of the POS computer component 110 includes: a processor 185, a memory 190 and control circuitry 195. The memory 190 includes both volatile and non-volatile memory. The non-volatile memory may include flash memory or other solid state electronic memory. Software stored in the memory 190 is executed by the processor 185 and causes the processor 185 to control the devices and peripherals attached to the POS computer component 110 and the operations and features of the POS terminal 100. The control circuitry 195 provides an interface between the processor 185 and the memory 190 and between the processor 185 and an internal computer bus 180 used to communicate with devices that comprise the POS computer component 110 such as the communications controller 165 and the audio output device 197. The communications controller 165 includes hardware and software required for the POS computer component 110 to communicate over the computer peripheral network 160 and with other devices and peripherals connected to the POS computer component 110 such as the operator display device 175. The operator display device 175 is an LCD display used to communicate with an operator using the POS terminal 100.

Turning to FIG. 2A, there is provided a high-level drawing illustrating an exemplary embodiment of the hybrid optical code scanner 105. The hybrid optical code scanner 105 includes a housing 200 comprising a vertical housing component 210 and horizontal housing component 205. The vertical housing component 210 includes vertical scanning window 220 and the horizontal housing component 205 includes a horizontal scanning window 215. The vertical scanning window 220 faces the front 225 of the hybrid optical code scanner 105. An operator of the hybrid optical code scanner 105 stands in front 225 of the hybrid optical code scanner 105 facing the vertical scanning window 220 and moves optical codes (FIG. 3, 300) for scanning through an optimal scanning position (FIG. 3, 370) generally above the horizontal scanning window 215 and in front of the vertical scanning window 220. While not explicitly shown, the horizontal scanning window 215 can include an integrated weigh scale for weighing items that are sold by weight.

FIG. 2B provides a high-level drawing illustrating an exemplary embodiment of a point of sale terminal 100. FIG. 2B depicts a number of POS peripherals 168 including a magnetic card reader 240, a cash receiver 245, a coin receiver 250, receipt printer 255, a security scale 260 and a cash dispenser 265. The POS peripherals are connected to and communicate with the POS computer component 110 over the peripheral computer network 160. The POS computer component 110 executes software stored in the memory 190 which causes the processor 185 to communicate with and control the POS peripherals 168.

The POS terminal 100 includes a conveyor belt 275 for moving items for purchase to hybrid scanner 105 for scanning. Next to the hybrid scanner 105 as a bagging area with bags 270. The bags 270 are attached to or sit on the security scale 260 which is used to weigh items placed in the bags 270.

An exploded view of the operator display device 175 is provided. In the exploded view, instructions 235 to the operator for using the video images and positioning the optical code 300 are provided. The video images are displayed in a graphical window 230.

Figure 3:
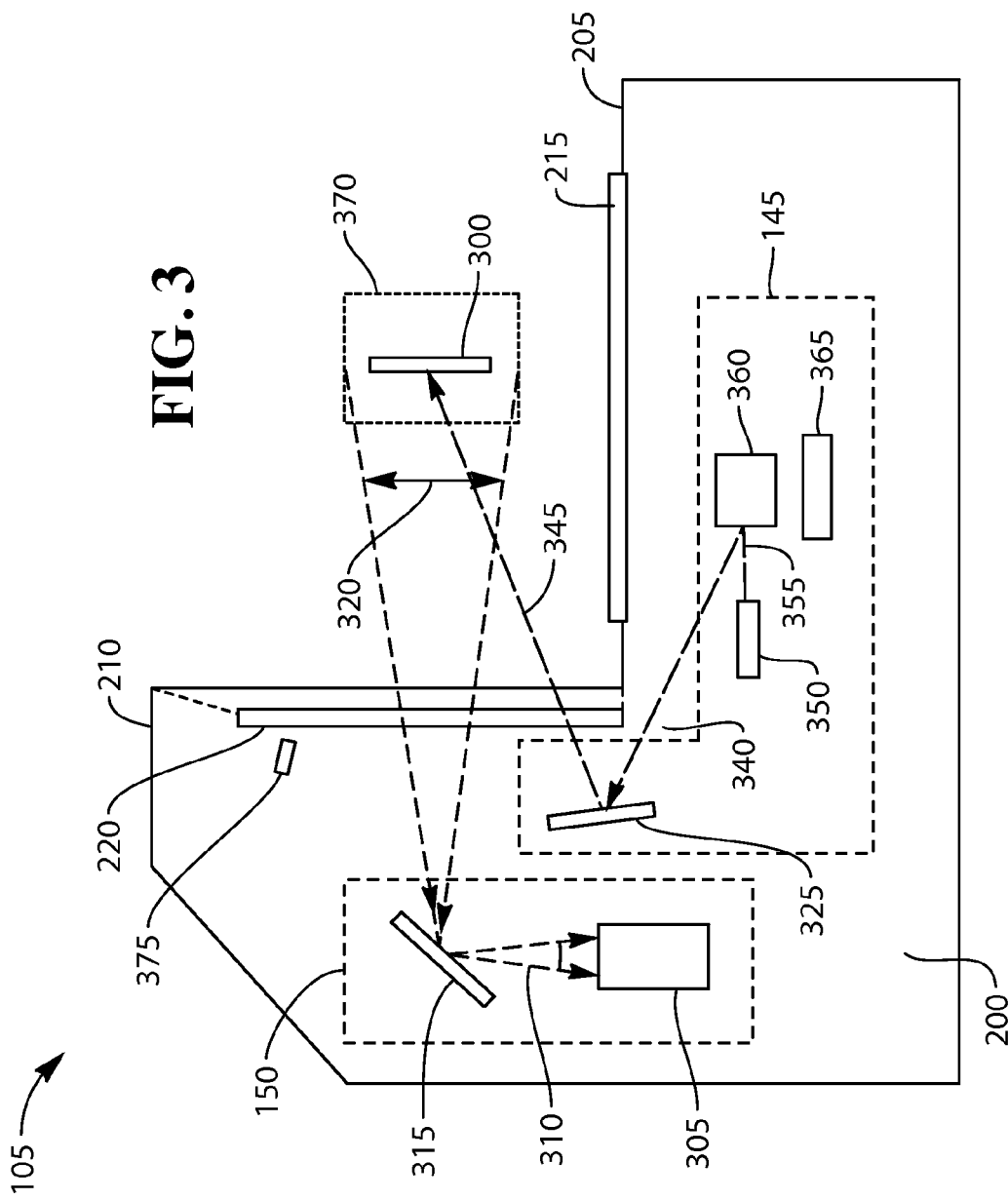
FIG. 3 is a high-level cross-sectional drawing further illustrating the exemplary embodiment of the hybrid optical code scanner.

FIG. 3 provides a high-level cross-sectional drawing further illustrating the exemplary embodiment of the hybrid optical code scanner 105. Components of the image scanner 150 and laser scanner 145 are presented to illustrate certain functions of the hybrid scanner 105. Not all components of the image scanner 150 and laser scanner 145 are depicted. Additionally, the laser scanner 145 scans through both the vertical scanning window 220 and the horizontal scanning window 215 (scanning through horizontal scanning window 215 not shown in FIG. 3). A more complete discussion of a laser scanner is found in U.S. Pat. No. 6,866,197 issued Mar. 15, 2005 by Detwiler et al. which is herein incorporated by reference.

The laser scanner 145 includes a laser beam generating device 350, a laser beam directing device 360 used to redirect a laser beam 355 generated by the laser beam generating device 350 and a photo-detector 365 that detects laser light reflected back to the laser scanner 145 from the optical code 300. The laser scanner 145 further includes a pattern mirror 325 that redirects a laser beam 340, reflected by the laser beam directing device 360, through the vertical scanning window 220 to the optical code 300 as a laser beam 345. The pattern mirror 325 is one of a plurality of pattern mirrors (others not shown) used to redirect laser light.

The laser beam directing device 360 rotates causing the laser beam 345 to move through and scan a large volume of space. When the laser beam 345 strikes and moves across the optical code 300, laser light is reflected off of the optical code 300 and directed (directing devices not shown) back inside the hybrid scanner 105 where the laser light is detected by the photo-detector 365. Data generated by the photo-detector 365 is processed by the processor 120 and data encoded in the optical code recovered. Laser scanners are best suited for reading one-dimensional (1D) barcodes. In general, they cannot read a 2D barcode or they are very inefficient at reading a 2D barcode.

The imaging scanner 150 includes an image capture device 305 such as a CMOS image sensor. When the optical code 300 is presented to the imaging scanner 150, it is illuminated by a light source 375, a reflected image of the optical code 300 travels along an image path 320 to a mirror 315 where the reflected image is redirected along a path 310 to the image capture device 305 which captures the reflected image. The image capture device 305 is commanded to a capture an image by the processor 120 which then processes the captured image to determine if an optical code is present and if there is an optical code, extract data from it.

The image capture device 305 can be operated in a single image capture mode or a streaming video mode. In the streaming video mode, the image capture device 305 continuously captures images to produce streaming video which is transmitted from the hybrid scanner 105 over the computer peripheral network 160 to the POS computer component 110. The processor 120 processes images captured by the image capture device 305 no matter which mode is it operating in. In some embodiments, the performance of the processor 120 is not sufficient to process every captured image when the image capture device 305 is operating in the streaming video mode. In these embodiments, every other or every third image is processed.

The percentage of successful first pass scans is a metric used to measure the performance of an optical code scanner. It is desirable to have a high percentage of successful first pass reads because every failed first pass scan requires one or more additional scans which increases the total time required to scan the optical code and process the associated item as part of a purchase transaction. Achieving a high successful first pass scan rate is accomplished by positioning the optical code 300 in the optimal scanning position 370 for the imaging scanner 150. The optimal scanning position 370 is located over the horizontal scanning window 215 and in front of the vertical scanning window 220. The optimal scanning position 370 is determined based on the optimal field of vision and optimal depth of field for the imaging scanner 150. Therefore, to achieve a high first scan success rate, the optical code 300 should be located in the optimal scanning position 370 facing the vertical scanning window 220. The optical code 300 will then be visible (in the field of vision) and in focus (in the depth of field) to the image capture device 305.

The location of the optimal scanning position is a function of the design of the imaging scanner and components that comprise the imaging scanner. Thus, for different imaging scanners, the location of the optimal scanning position can change.

In practice, finding the optimal scanning position 370 of the imaging scanner 150 may be difficult, especially for new or untrained operators. An operator typically moves the optical code 300 to multiple locations, in a trial and error fashion, before the optical code 300 is successfully read. To assist the operator in quickly finding the optimal scanning position 370, the point of sale computer component 110 displays real-time video images received from the image capture device 305. The real-time video images are displayed on the operator display device 175 along with indicia indicating the location of the optimal scanning position 370. The indicia are superimposed on the video images. The operator, using the video images, sees the optical code 300 and the optimal scanning position 370 and using this visual information can quickly move the optical code 300 to the optimal scanning position 370.

In addition to quickly finding the optimal scanning position 370, the video images also provide information regarding other problems that will prevent a successful scan of the optical code 300. If the optical code 300 has a glossy or reflective surface, or if the optical code 300 is being presented on the display of a portable electronic device, specular reflections can obscure the optical code 300 and prevent a successful scan. A user viewing the video images will see a specular reflection as a glare that obscures some or all of the optical code 300. Tilting the optical code 300 slightly in any direction will remove the specular reflection from the video images and lead to a successful scan. In some embodiments, the video images are processed and if it is determined that specular reflections are present, indicia are superimposed on the video images to indicate the optical code 300 should be tilted. The indicia is removed when the specular reflections are no longer present.

Figure 4:
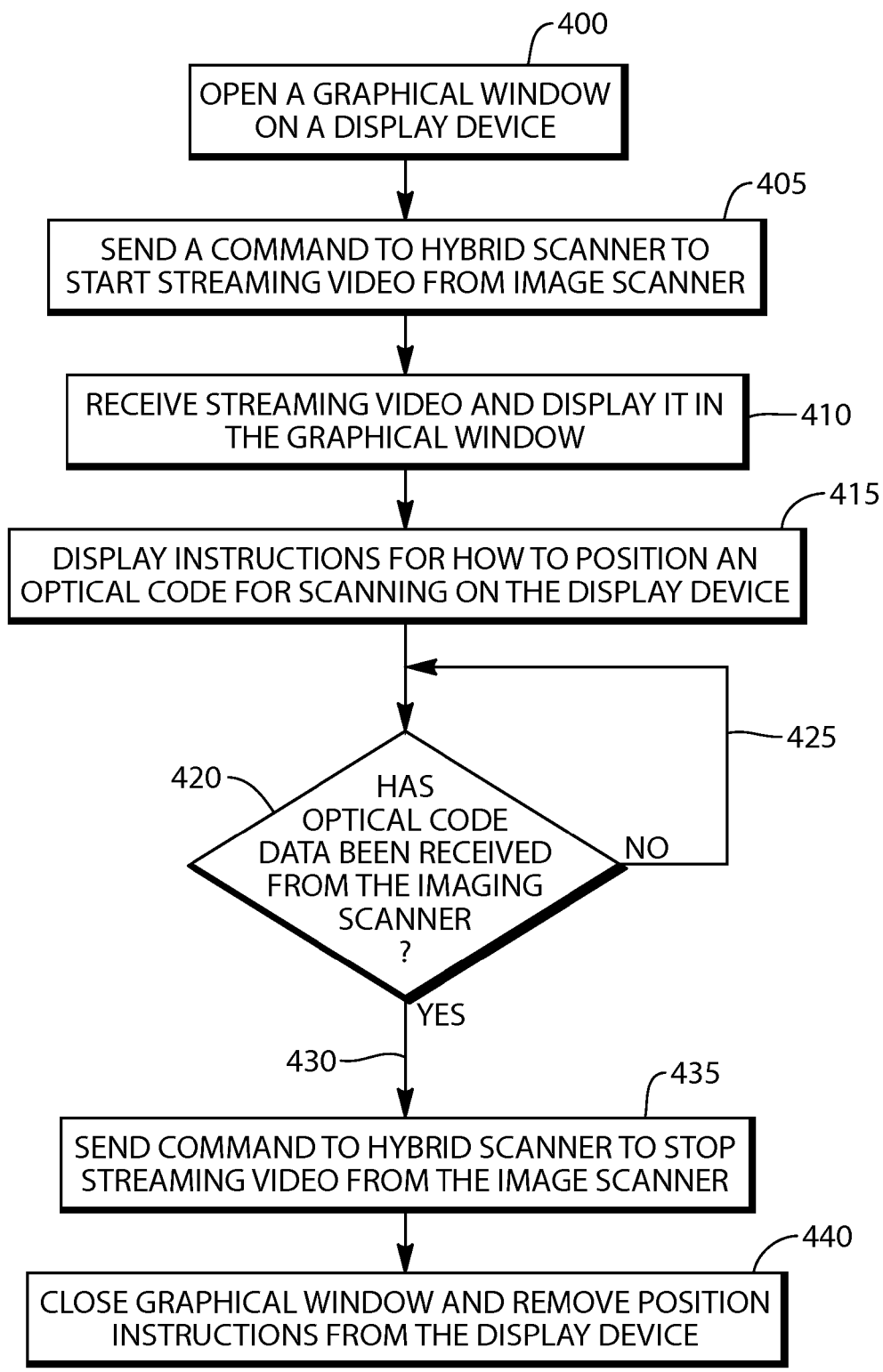
FIG. 4 is a high-level flow chart illustrating an exemplary method for providing optical code positioning information to an operator.

FIG. 4 illustrates a high-level flow chart illustrating an exemplary method for providing optical code positioning information to an operator of the point of sale terminal 100. At step 400, a graphical window 230 is opened on the operator display device 175 of the point of sale terminal 110. Both text 235 and video can be displayed in the graphical window 230. At step 405, a command to start streaming real-time video images from the image capture device 305 of the imaging scanner 150 is sent to the hybrid scanner 105.

At step 410, real-time video images captured by the image capture device 305 are continuously received and displayed in the graphical window 230 on the operator display device 175. Images captured by the image capture device 305 are processed to read the optical code 300. Thus, video images from the image capture device 305 provide unique information regarding the proper positioning of the optical code 300. Step 410 includes continuously receiving and displaying video images and can be implemented as a separate application or as a process thread that executes in parallel with the main process. In some embodiments, the video images are processed by the processor 185 to horizontally flip the images prior to being displayed. The flipping process is advantageously provided because images captured by the image capture device 305 are a mirror image of the actual scene. If the captured images are not flipped, actions depicted in the video would be reversed from the actual actions and create confusion for the operator.

In still other embodiments, the video images are processed by the processor 185 to add indicia indicating the optimal scanning position 370 for an optical code 300. In some embodiments, the indicia are superimposed on the video images. The indicia can include cross-hairs that indicate the center of the optimal scanning position 370. In some embodiments, the indicia include an indication of the boundaries of the optimal scanning position 370. In other embodiments, the video images are further processed to determine if the optical code 300 is positioned within the depth of field and field of view of the image capture device 305. Indicia are generated to indicate to the operator which direction to move the optical code 300 to position it at the optimal scanning position 370. The indications can include moving the optical code 300: left or right, up or down, or toward or away from the vertical scanning window 220.

In step 415, instructions 235 for positioning the optical code 300 for scanning are displayed on the operator display device 175. The instructions inform the operator how to use the video images and the indicia to position the optical code 300 in the optimal scanning position. In some embodiments, the instructions are presented audibly to the operator using the audio output device 197.

At step 420, the process waits 425 until it receives optical code data from the imaging scanner 150 indicating that the optical code 300 has been properly positioned and read. If optical code data is received, the process continues 430 to step 435. In some embodiments, scan status indicia are provided that indicate to the operator that the optical code 300 has been successfully scanned.

At step 435, a command is sent to the hybrid scanner 105 to stop streaming real-time video. At step 440, the graphical window on the operator display device 175 is closed.

Although particular reference has been made to an embodiment that includes a self-service point of sale terminal that includes a hybrid optical code scanner and examples have been provided illustrating the invention in combination with a laser and imaging scanner, certain other embodiments, variations and modifications are also envisioned within the spirit and scope of the following claims. For example, there are embodiments where the point of sale terminal includes an imaging scanner without a laser scanner. Additional embodiments that include an assisted service POS terminal with an imaging scanner are also envisioned to provide training to new employees learning to use an imaging scanner.

I claim:

1. A point of sale terminal comprising:
   a display device operable to display text and video data to an operator of the point of sale terminal;
   a computer peripheral network operable to communicate with peripherals attached to the point of sale terminal;
   first processing elements operable to communicate with and control peripherals attached to the computer peripheral network and to control the display device; and
   an imaging scanner for scanning an optical code where the imaging scanner is connected to the computer peripheral network, the imaging scanner including:
   an image capture device operable to capture an image and further operable to capture continuous images to produce a video stream; and
   second processing elements operable to analyze captured images to extract data from the optical code and further operable to send the video stream over the computer peripheral network; and
   where the first processing elements are further operable to receive the video stream from the imaging scanner, display the video stream on the display device and provide instructions for optimal positioning of the optical code for scanning.

2. The terminal of claim 1, wherein the instructions for positioning the optical code are displayed on the display device.

3. The terminal of claim 1, where the point of sale terminal further comprises an audio output device and wherein the instructions for positioning the optical code are audible instructions produced by the audio output device.

4. The terminal of claim 1, wherein the first processing elements are further operable to horizontally flip the images of the video stream prior to displaying them on the display device.

5. The terminal of claim 1, further comprising a laser scanner operable to scan optical codes.

6. The terminal of claim 1, wherein the first processing elements are further operable to superimpose on the video stream indicia indicating the optimal scanning position for the optical code.

7. The terminal of claim 1, wherein the optical code is a barcode.

8. The terminal of claim 7, wherein the barcode is a two-dimensional barcode.

9. The terminal of claim 1, wherein the optical code presented to the imaging scanner is displayed on a portable electronic device.

10. A computer implemented method of imaging scanning an optical code by a point of sale terminal, the method comprising the steps of:
    receiving real-time video images from an image capture device of an imaging scanner;
    modifying the real-time video to superimpose positioning indicia on the video wherein the positioning indicia indicates the optimal scanning position for scanning the optical code;
    displaying the modified video images including the positioning indicia on a display device of the point of sale terminal; and
    receiving from the imaging scanner data extracted from the optical code.

11. The method of claim 10, further comprising the step of:
    displaying on the display device instructions to position the optical code in the indicated optimal scanning position.

12. The method of claim 10, further comprising the step of:
    sending a command to the imaging scanner to start streaming real-time video to the point of sale terminal.

13. The method of claim 12, further comprising the step of:
    sending a command to the imaging scanner to stop streaming real-time video to the point of sale terminal after receiving data decoded from the optical code.

14. The method of claim 10, further comprising the step of:
    opening a graphical window on the display device of the point of sale terminal.

15. The method of claim 14, wherein the real-time video and positioning indicia are displayed in the graphical window.

16. The method of claim 10, wherein the optical code is a two-dimensional barcode.

17. The method of claim 10, wherein the optical code is displayed on a portable electronic device presented for scanning.

18. The method of claim 10, wherein the positioning indicia further include indicia indicating the center of the optimal scanning position.

19. The method of claim 10, wherein the positioning indicia further include indicia indicating the optical code has been scanned and decoded.

20. The method of claim 10, wherein modifying the video image further includes processing the video images to horizontally flipping each image.

21. The method of claim 10, wherein modifying the real-time video images includes wherein when the real-time video includes specular reflections from the optical code, indicia is superimposed on the video to indicate a movement to remove the specular reflections.

* * * * *